Sept. 7, 1954 W. H. BIXBY 2,688,721
VOLTAGE REGULATION
Filed June 29, 1948
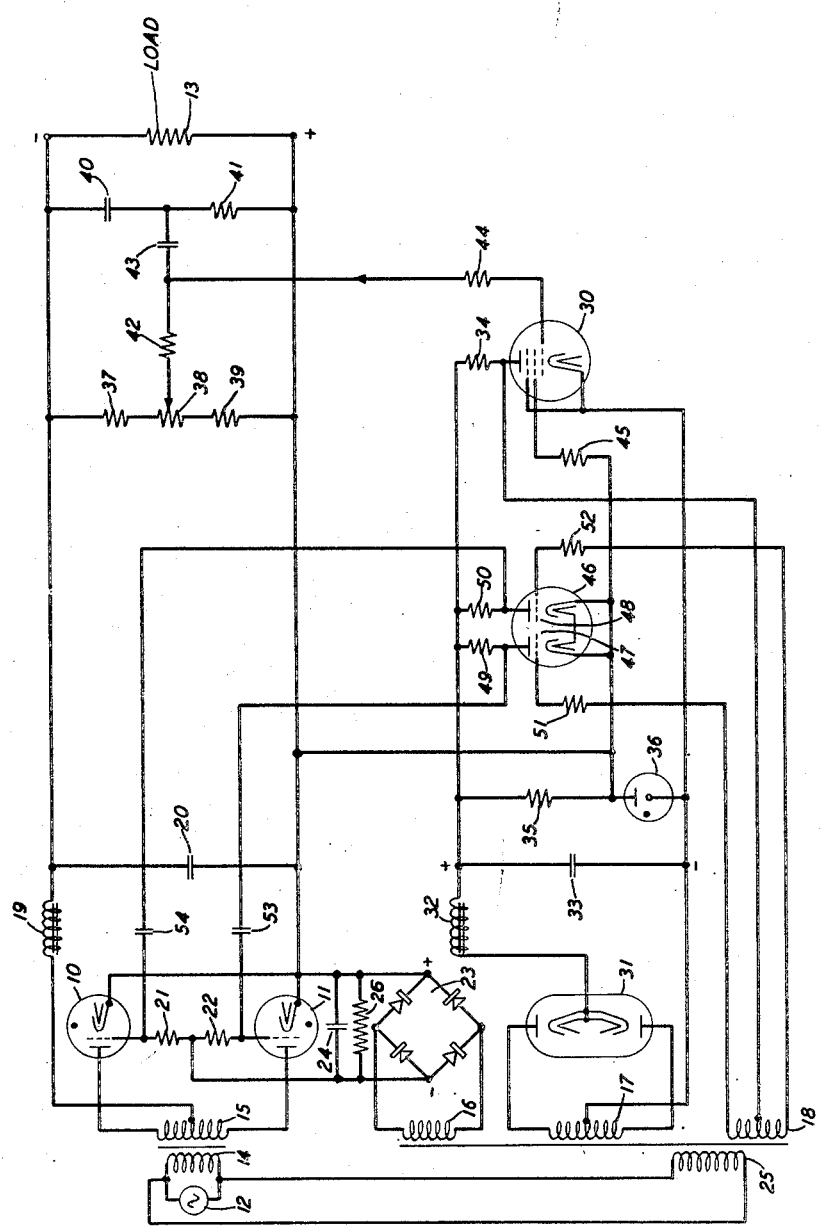
INVENTOR
W. H. BIXBY
BY
G. F. Heuerman
ATTORNEY Patented Sept. 7, 1954

2,688,721

UNITED STATES PATENT OFFICE 2,688,721

VOLTAGE REGULATION

William H. Bixby, Detroit, Mich., assignor to Donald R. Middleton and Stanley M. Hanley, a copartnership, doing business as Power Equipment Company, Detroit, Mich.

Application June 29, 1948, Serial No. 35,948

8 Claims. (Cl. 321—18)

1

This invention relates to voltage regulation and particularly to a rectifier for supplying current to a load at substantially constant voltage.

An object of the invention is to provide improved regulated rectifying apparatus for supplying direct current to a load.

In accordance with an embodiment of the invention herein shown and described for the purpose of illustration, there is provided a polyphase rectifier comprising a plurality of grid controlled, gas-filled, space current devices, one for each phase, for rectifying current from an alternating current supply source, the rectified current being supplied to a load. While a two-phase rectifier is specifically shown, the invention is also applicable to rectifiers having a larger number of phases. Means are provided for generating large amplitude voltage pulses having a steep wave front which are impressed upon the control grid-cathode circuits of the rectifier tubes repeatedly in succession for causing the tubes, respectively, to conduct space current during successive periods in which the anodes of the respective tubes are positive with respect to the cathodes. When conduction is started in each tube, it will continue to pass space current during a time interval equal to that of a half cycle of the alternating current supply source. There is provided for generating the triggering pulses for starting conduction in the rectifier tubes a circuit arrangement comprising a plurality of space current devices or pulse generating triodes, one for each rectifier tube. There is impressed upon the control grid-cathode circuit of each of the pulse generating devices a voltage having an alternating voltage component derived from the alternating current supply source and a direct voltage component having variations corresponding to load voltage changes, the series of triggering pulses being advanced or delayed in response to load voltage changes to control the current supplied to the load and thereby to control the load voltage.

The invention will now be described in greater detail with reference to the accompanying drawing, the single figure of which is a schematic view of a regulated rectifier embodying the invention.

Referring to the drawing, there is provided a rectifier comprising three-electrode, gas-filled, space current devices 10 and 11 for rectifying current from an alternating current supply source 12 and for supplying the rectified current to a load 13. A two-phase rectifier is shown for the sake of simplicity, the invention also being ap-

2 plicable to a rectifier having a smaller or larger number of phases, a six-phase rectifier for example. There is provided a transformer having a primary winding 14 connected to the alternating current source 12 and a secondary winding 15. There is provided a second transformer having a primary winding 25 connected to the supply source 12 and having secondary windings 16, 17 and 18. The end terminals of transformer winding 15 are connected to the anodes, respectively, of rectifier tubes 10 and 11 and a mid-tap of winding 15 is connected through inductive reactance element 19 of a ripple filter to the negative load terminal, the filter also comprising a shunt condenser 20 connected across the load. The cathodes of tubes 10 and 11 are connected to the positive load terminal. The control grids of tubes 10 and 11 are connected by resistors 21 and 22, each having a resistance of the order of 47,000 ohms. A bridge type rectifier 23 having an asymmetrically conducting element in each arm of the bridge has its input terminals connected to the terminals of secondary transformer winding 16. The positive output terminal of rectifier 23 is connected to the cathodes of tubes 10 and 11 and the negative output terminal of rectifier 23 is connected to the common terminal of resistors 21 and 22. A filtering condenser 24 and a bleeder resistor 26 are connected across the output terminals of rectifier 23. The control grid of each of tubes 10 and 11 is thus negatively biased with respect to its cathode to prevent space current conduction in each tube in the absence of a positive potential triggering or starting pulse impressed upon the control grid with respect to the cathode.

There is provided an amplifier comprising a space current device 30 for setting up a direct voltage having variations corresponding to load voltage changes but of larger amplitude. Space current is supplied to tube 30 from an auxiliary rectifier comprising a full wave rectifier tube 31. The anodes of tube 31 are connected to the end terminals of transformer winding 17 and the mid-terminal of the winding is connected to the negative output terminal of the rectifier. A ripple filter comprising a series inductive reactive element 32 and a shunt condenser 33 is provided, the cathode of tube 31 being connected through inductance element 32 to the positive output terminal of the rectifier. The positive terminal of rectifier 31 is connected through a resistor 34 to the anode of tube 30 while the negative output terminal of the rectifier is connected directly to the cathode of tube 30. A shunt current path connected to the output terminals of rectifier 31 comprises in series a resistor 35 and a cold cathode, gas-filled tube 36. The tube 36 has the characteristic that its resistance changes in response to changes of current flowing through the tube so that the voltage across the tube remains substantially constant, output voltage changes of rectifier 31 appearing across resistor 35.

Two current paths are connected across the load 13, one comprising resistor 37, potentiometer 38 and resistor 39, all in series, and the other comprising a condenser 40 and a resistor 41 in series. A path connecting the variable tap of potentiometer 38 and the common terminal of condenser 40 and resistor 41 comprises in series a resistor 42 and a condenser 43. The common terminal of resistor 42 and condenser 43 is connected through a resistor 44 to the control electrode of tube 30. The cathode of tube 30 is connected through constant voltage tube 36 to the positive load terminal. There is thus impressed upon the control grid-cathode circuit of tube 30 a voltage equal to the difference of the voltage across resistor 39 and an adjustable portion of potentiometer 38 and the voltage across constant voltage tube 36, these two component voltages preferably being such that the control grid potential is negative with respect to the cathode potential by a suitable operating value. The network comprising condensers 40 and 43 and resistor 41 is provided to prevent hunting action of the regulator circuit. Screen grid potential is supplied to tube 30 from the common terminal of resistor 35 and constant voltage tube 36 through a resistor 45.

There is provided a pulse generating circuit arrangement comprising a twin triode tube 46 having two triode space current devices 47 and 48. The cathodes of triodes 47 and 48 are connected to the common terminal of resistor 35 and constant voltage tube 36. The positive terminal of rectifier 31 is connected through a resistor 49 to the anode of triode 47 and through a resistor 50 to the anode of triode 48. Resistors 49 and 50 each have a resistance of the order of 22,000 ohms. One end terminal of secondary transformer winding 18 is connected through a resistor 51 to the control electrode of triode 47 and the other end terminal of winding 18 is connected through a resistor 52 to the control electrode of triode 48, resistors 51 and 52 having a resistance of the order of 470,000 ohms. A mid-terminal of transformer winding 18 is connected to the anode of tube 30. The anode of triode 47 is connected through a condenser 53 to the control grid of tube 11 and the anode of triode 48 is connected through a condenser 54 to the control grid of tube 10, the capacitance of each of condensers 53 and 54 being of the order of 0.05 microfarad.

The grid-cathode circuit of tube 30 comprises, in series, resistors 44, 42 and 39, an adjustable portion of potentiometer 38 and constant voltage tube 36. If the load voltage should increase, for example, the control grid of tube 30 would become relatively more negative with respect to its cathode, thus causing the voltage across resistor 34 to decrease and the potential at the anode of tube 30 to become relatively more positive with respect to its cathode and, therefore, with respect to the positive load terminal. The voltage across resistor 35 will increase in response to an increase of voltage of the supply source 12 and vice versa. The grid-cathode circuit of triode 47 may be traced from the grid through resistor 51, the upper portion of winding 18, resistor 34 and resistor 35, to the cathode. A similar circuit may be traced for the triode 48, this circuit including resistor 52 and the lower portion of winding 18. The voltages across resistors 34 and 35 are in opposition in each of these circuits and the voltage across resistor 34 is smaller than the voltage across resistor 35 so that the resultant direct voltage component in the grid-cathode circuit is of such polarity as to make the control grid positive with respect to the cathode. The phase of the alternating component voltage from transformer 18 impressed upon the control circuit of triode 47, for example, is preferably in phase opposition to the voltage which is impressed from the lower portion of transformer winding 15 upon the anode-cathode circuit of tube 11.

The large resistance of resistor 51 in the grid-cathode circuit of triode 47, for example, limits the positive potential which can appear at the grid with respect to the cathode to a relatively small value because of the grid current which flows through the resistor. As a result, when the grid is positive, the triode will pass a fixed space current and the potential at the anode will remain substantially fixed with respect to the cathode up to the time when the alternating voltage component in the grid-cathode circuit suddenly drives the grid to a negative potential through the cut-off value, causing the space current to decrease rapidly to zero. The alternating voltage component in the grid-cathode circuit has a large amplitude such that the change of grid-cathode voltage from a positive value to a negative cut-off value will occur within a very brief time interval. The resulting abrupt decrease of space current in triode 47 will produce an abrupt rise of the potential at the anode of triode 47 with respect to its cathode and, therefore, with respect to the cathode of tube 11. This sharp, positive pulse is impressed through condenser 53 upon the control grid of tube 11 to cause it to conduct space current, this conduction continuing during a period in which the anode of tube 11 is positive with respect to its cathode. The sum of the voltage across inductance element 19 and the voltage across the lower half of transformer winding 15 maintains the anode of tube 11 positive with respect to its cathode until conduction is initiated in tube 10.

The circuit should be so adjusted that the potential of the anode of amplifier tube 30 will not be appreciably less than the potential of the screen grid of the tube for any normal operating condition. Since, with the choke coil 19 in the input of the main filter section, full control of the output current will be obtained by varying the firing angle of each of tubes 10 and 11 over a range from zero to ninety degrees in the respective conducting half cycles of tubes 10 and 11, the firing angle should be approximately at zero degrees when the potential of the anode of tube 30 is approximately at the screen grid potential of tube 30. The alternating component of the control electrode-cathode voltage of triode 47, for example, is therefore preferably in phase opposition to the alternating voltage across the lower half of transformer winding 15. In some rectifiers, such as two phase rectifiers employing a filter choke 19 the inductance of which is less than a certain critical value or rectifiers having a larger number of phases, it would be necessary to provide a phase shifter for shifting the phase of the voltages derived from source 12 and applied to the control electrode-cathode circuits of the pulse generating triodes like triodes 47 and 48.

An increase of the direct component of the grid-cathode voltage of triode 47, for example, will cause the cut-off potential of the triode to be reached later in each cycle of the alternating voltage component of the grid-cathode voltage of the triode. As a result, the triggering or starting pulse impressed upon the grid-cathode circuit of tube 11 will occur later in the positive half cycle of the anode-cathode voltage, that is, when the anode is positive with respect to the cathode. The average voltage supplied by the rectifier to the input of filter 19, 20 is thus decreased. A negative pulse will be produced at the anode of triode 47 when space current is started in the triode due to the grid potential passing through the cut-off value to a positive value of potential. This negative pulse will have no effect on the space current path of tube 11 and it may therefore be disregarded in considering the operation of the current supply circuit. The triode 48 is controlled similarly to the triode 47 to produce recurring positive pulses for starting conduction of space current in tube 10 during half cycle periods of the alternating voltage from source 12 when the anode of tube 10 is positive with respect to its cathode.

The load voltage may be set at a desired value within an operating range by adjusting the variable tap of potentiometer 38. When the potentiometer is adjusted for maximum operating voltage, the voltage across resistor 34 is at a relatively large value and, when the voltage of source 12 is at a minimum operating value, the voltage across resistor 35 is at a minimum value. Under these conditions the direct voltage component in the grid-cathode circuit of each of triodes 47 and 48 is relatively small and conduction of space current in tubes 10 and 11 will occur relatively early in the positive half cycle of the anode-cathode voltage of each of tubes 10 and 11. For any setting of potentiometer 38, when an increase of load voltage occurs, for example, the control grid of tube 30 will become relatively more negative with respect to its cathode with the result that the voltage drop across resistor 34 will decrease. The direct voltage component in the grid-cathode circuit of triodes 47 and 48 will thus increase to cause the starting pulses impressed upon the grid-cathode circuits of tubes 10 and 11 to be delayed. The average voltage supplied by the rectifier to filter 19, 20 is thus decreased to cause the initially assumed increase of load voltage to be minimized. Similarly, when the voltage of the supply source increases, for example, the direct component of the voltage in the grid-cathode circuits of triodes 47 and 48 increases to cause the starting pulses for tubes 10 and 11 to be delayed and thereby causing a decrease of the voltage supplied by the rectifier to filter 19, 20. This action thus tends to prevent a rise of load voltage due to the voltage increase of the alternating current source 12.

What is claimed is:

1. In combination, means comprising a gas-filled space current device having an anode, a cathode and a control electrode for rectifying and controlling the supply of rectified current from an alternating current supply source to a load, a second space current device having an anode, a cathode and a control electrode, means for causing current to flow in a circuit including the space current path of said second device, means for setting up across a portion of said circuit recurring voltage pulses in response to interruptions of the space current in said circuit, said means comprising means for impressing upon a circuit connecting said control electrode and cathode of said second device a voltage having an alternating component derived from said supply source and a direct component the amplitude of which varies in accordance with load voltage variations, each of said pulses being of brief duration with respect to the period of a half cycle of the alternating current from said supply source, and means for impressing said voltage pulses upon a circuit connecting the control electrode and cathode of said first space current device for repeatedly initiating conduction of space current in said first device coincidentally with said voltage pulses.

2. A combination in accordance with claim 1 in which there is provided means for biasing the control electrode of said first space current device negatively with respect to its cathode for preventing the initiation of space current conduction in said device except during that portion of each half cycle of said alternating current source when the anode is positive with respect to the cathode which follows each of said voltage pulses.

3. In combination, two gas-filled space current devices each having an anode, a cathode and a control electrode, circuits connecting the anode and cathode of said devices, respectively, means for impressing upon said circuits, respectively, out of phase alternating voltages derived from an alternating current supply source, a third circuit comprising in series order a first resistor, a second resistor, a first condenser, a third resistor, a fourth resistor and a second condenser, a source of direct voltage, means for connecting the positive and negative terminals of said direct voltage source to said cathodes and to the common terminal of said first and second resistors, respectively, means for connecting the common terminal of said first resistor and said second condenser to the control electrode of a first of said space current devices, means for connecting a common terminal of said second resistor and said first condenser to the control electrode of the second space current device, a direct current source, a fourth circuit comprising said third resistor and said direct current source, a fifth circuit comprising said fourth resistor and said direct current source, the positive terminal of said direct current source being connected to a common terminal of said third and fourth resistors, means for connecting the negative terminal of said direct current source to said cathodes, and means under control of said alternating current supply source for interrupting the currents in said fourth and fifth circuits respectively repeatedly in succession for causing voltage pulses to be impressed upon the control electrodes with respect to the cathodes of said space current devices, respectively, to repeatedly and successively initiate space current conduction in said devices, respectively.

4. A combination in accordance with claim 3 in which said last-mentioned means comprises a third and a fourth space current device each having an anode, a cathode and a control electrode, means for connecting the space current paths of said third and fourth devices in said fourth and fifth circuits, respectively, a sixth circuit and a seventh circuit connecting the control electrode and cathode of said third and fourth devices, respectively, each of said circuits having resistance of large magnitude therein, and means for impressing on said sixth and seventh circuits out of phase alternating voltages derived from said alternating current supply source.

5. In combination, means comprising a gaseous space current device having an anode, a cathode and a control electrode for rectifying current from an alternating current source and for controlling the supply of the rectified current to a load, means for impressing a negative biasing potential upon said control electrode with respect to said cathode comprising a circuit connecting said control electrode and said cathode, said circuit including a source of direct voltage and a resistor, means for setting up a control voltage having variations corresponding to load voltage changes, a second space current device having an anode, a cathode and a control electrode, a resistor, a space current circuit for said second device comprising said resistor and a source of space current, a condenser, a circuit comprising said condenser for connecting the anode-cathode path of said second space current device to the control electrode-cathode path of said gaseous discharge device, and means for setting up recurring pulses for repeatedly initiating conduction of space current in said gaseous discharge device to control the current supplied to the load, said last-mentioned means comprising a circuit connecting the control electrode and cathode of said second space current device and means for impressing upon said last-named circuit a voltage having an alternating component derived from said alternating current source and said control voltage.

6. A regulated power supply comprising a rectifier circuit including an electron discharge device, means for impressing an alternating voltage on said rectifier circuit, an output circuit coupled to said rectifier circuit for deriving a regulated unidirectional output voltage, a source of electrical waves coupled to said output circuit, and means for deriving pulses from said wave source and impressing them on said electron discharge device, the frequency of said pulses being responsive to variations of said output voltage, thereby to control said electron discharge device in response to variations of said output voltage.

7. A regulated power supply comprising a rectifier circuit including a space current device, means for impressing an alternating voltage on said rectifier circuit, an output circuit coupled to said rectifier circuit for deriving a regulated unidirectional output voltage, and means for generating and impressing upon said space current device intermittent pulses each of brief duration with respect to a half cycle period of said alternating voltage for causing space current conduction to be repeatedly initiated in said space current device, said last-mentioned means comprising means electrically coupling said space current device to said output circuit and responsive to variations of said output voltage for controlling the relative phase of said pulses with respect to said alternating voltage.

8. In combination, means comprising a first space current device for supplying rectified current from an alternating-current supply source to a load circuit including a load, said device having an anode, a cathode and a control electrode; means for impressing a biasing potential upon said control electrode with respect to said cathode, a second space current device having an anode, a cathode and a control electrode, a first circuit including a source of space current connecting the anode and cathode of said second device, means for deriving an alternating voltage from said alternating-current supply source, means coupled to said load circuit for setting up a voltage having variations corresponding to load voltage changes, a second circuit connecting the control electrode and cathode of said second device, means for impressing upon said second circuit said alternating voltage and said voltage having variations corresponding to load voltage changes, and means for deriving from said first circuit and impressing upon the control electrode with respect to the cathode of said first device for overcoming said biasing potential and repeatedly initiating space current conduction in said first device pulses the frequency of which is responsive to said load voltage changes, thereby controlling said first device in response to said load voltage changes.

References Cited in the file of this patent

UNITED STATES PATENTS

| Number | Name | Date |
| --- | --- | --- |
| 1,558,938 | Slepian | Oct. 27, 1925 |
| 1,870,022 | Prince | Aug. 2, 1932 |
| 2,030,801 | Ross | Feb. 11, 1936 |
| 2,056,610 | Leuthold | Oct. 6, 1936 |
| 2,059,562 | Curtis | Nov. 3, 1936 |
| 2,123,241 | Harley | July 12, 1938 |
| 2,151,560 | Morack | Mar. 21, 1939 |
| 2,248,821 | Haselton et al. | July 8, 1941 |
| 2,250,102 | Klemperer | July 22, 1941 |
| 2,373,750 | Faulkner | Apr. 17, 1945 |
| 2,400,599 | Reeves | May 21, 1946 |
| 2,453,451 | Moseley | Nov. 9, 1948 |
| 2,458,454 | Winther | Jan. 4, 1949 |